US012659450B2

(12) United States Patent
Fasogbon

(10) Patent No.: US 12,659,450 B2
(45) Date of Patent: Jun. 16, 2026

(54) METHOD, AN APPARATUS AND A COMPUTER PROGRAM PRODUCT FOR REAL-TIME STREAMING OF VOLUMETRIC VIDEO

(71) Applicant: Nokia Technologies Oy, Espoo (FI)

(72) Inventor: Peter Oluwanisola Fasogbon, Espoo (FI)

(73) Assignee: Nokia Technologies Oy, Espoo (FI)

( * ) Notice: Subject to any disclaimer, the term of this patent is extended or adjusted under 35 U.S.C. 154(b) by 123 days.

(21) Appl. No.: 18/584,747

(22) Filed: Feb. 22, 2024

(65) Prior Publication Data
US 2024/0291956 A1 Aug. 29, 2024

(30) Foreign Application Priority Data

Feb. 28, 2023 (FI) ...................................... 20235240

(51) Int. Cl.
*H04N 13/388* (2018.01)
*G06T 5/40* (2006.01)
(Continued)

(52) U.S. Cl.
CPC ............. *H04N 13/388* (2018.05); *G06T 5/40* (2013.01); *G06T 7/80* (2017.01); *G06V 10/56* (2022.01);
(Continued)

(58) Field of Classification Search
CPC ........... H04N 13/388; G06T 5/40; G06T 7/80; G06T 2207/10024; G06V 10/56; G06V 10/60
(Continued)

(56) References Cited

U.S. PATENT DOCUMENTS

2006/0268131 A1 11/2006 Cutler
2018/0308254 A1* 10/2018 Fu .......................... G06V 20/64
(Continued)

FOREIGN PATENT DOCUMENTS

WO 2022/036539 A1 2/2022

OTHER PUBLICATIONS

Chen et al.; "High-accuracy multi-camera reconstruction enhanced by adaptive point cloud correction algorithm"; Optics and Lasers in Engineering (Year: 2019).*
(Continued)

*Primary Examiner* — David T Welch
(74) *Attorney, Agent, or Firm* — McCarter & English LLP

(57) ABSTRACT

The embodiments relate to a method, comprising receiving a plurality of volumetric frames representing an object in a scene from a multi-camera system, wherein a volumetric frame comprises color components and a depth component; determining at least partial overlaps of views presented by the volumetric frames between neighboring cameras of the multi-camera system to determine point correspondence in different frames and extracting pointclouds belonging to the object at the partial overlaps; determining a set of image processing parameters for each camera according to the pointclouds; and adjusting each camera of the multicamera system according to the set of image processing parameters. The embodiments also relate to an apparatus and a computer program product for implementing the method.

20 Claims, 5 Drawing Sheets

(51) Int. Cl.
| | | |
|---|---|---|
| *G06T 7/80* | (2017.01) | |
| *G06V 10/56* | (2022.01) | |
| *G06V 10/60* | (2022.01) | |

(52) U.S. Cl.
CPC .... *G06V 10/60* (2022.01); *G06T 2207/10024*
(2013.01)

(58) Field of Classification Search
USPC .......................................................... 345/419
See application file for complete search history.

(56) References Cited

U.S. PATENT DOCUMENTS

| | | | | |
|---|---|---|---|---|
| 2019/0082160 | A1* | 3/2019 | Yano | G06T 15/205 |
| 2019/0333237 | A1* | 10/2019 | Javidnia | G06T 7/593 |
| 2021/0398323 | A1* | 12/2021 | Lee | H04L 67/06 |
| 2022/0006999 | A1* | 1/2022 | Oh | H04L 65/61 |
| 2022/0189062 | A1 | 6/2022 | Seo et al. | |
| 2022/0343547 | A1* | 10/2022 | Moguillansky | H04N 19/597 |
| 2023/0419557 | A1* | 12/2023 | Yoon | H04N 19/70 |
| 2024/0027604 | A1* | 1/2024 | Lyu | G01S 7/40 |
| 2024/0203020 | A1* | 6/2024 | Thomas | G06T 15/00 |

OTHER PUBLICATIONS

Ullah et al.; "Automatic 360 Mono-Stereo Panorama Generation Using a Cost-Effective Multi-Camera System"; Sensors (Year: 2020).*

"Information technology—Coded Representation of Immersive Media—Part 5: Visual Volumetric Video-based Coding (V3C) and Video-based Point Cloud Compression (V-PCC)", SO/IEC JTC 1/SC 29/WG 07, ISO/IEC 23090-5, 2021, 370 pages.

"Advanced video coding for generic audiovisual services", Series H: Audiovisual and Multimedia Systems, Infrastructure of audiovisual services—Coding of moving video, ITU-T Recommendation H.264, Aug. 2021, 844 pages.

"High efficiency video coding", Series H: Audiovisual and Multimedia Systems, Infrastructure of audiovisual services—Coding of moving video, ITU-T Recommendation H.265, Aug. 2021, 716 pages.

U.S. Appl. No. 63/419,853, "Image Space Patch Refinement for Real-Time Volumetric Video Streaming", filed Oct. 27, 2022, pp. 1-76.

Collet et al., "High-Quality Streamable Free-Viewpoint Video", ACM Transactions on Graphics, vol. 34, No. 04, Article No. 69, Jul. 27, 2015, 13 pages.

Park et al., "Colored Point Cloud Registration Revisited", Proceedings of the IEEE International Conference on Computer Vision (ICCV), Oct. 22-29, 2017, pp. 143-152.

Mccamy et al., "A Color-Rendition Chart", Journal of Applied Photographic Engineering, vol. 02, No. 03, 1976, pp. 95-99.

Joshi et al., "Automatic Color Calibration for Large Camera Arrays", Technical Reports, Department of Computer Science & Engineering, UC San Diego, May 11, 2005, 4 pages.

Florea et al., "Logarithmic Tools for In-camera Image Processing", IET Irish Signals and Systems Conference (ISSC), Jun. 18-19, 2008, pp. 394-399.

"Jetson TX1/TX2 Multi Camera Exposure Feedback Control", RidgeRun Developer Wiki, Retrieved on Mar. 20, 2024, Webpage available at : https://developer.ridgerun.com/wiki/index.php/Jetson_TX1TX2_Multi_Camera_Exposure_Feedback_Control.

Ilie, "Ensuring Color Consistency across Multiple Cameras", Technical Report, Department of Computer Science, University of North Carolina at Chapel Hill, Apr. 2004, 9 pages.

Choi et al., "Iterative K-Closest Point Algorithms for Colored Point Cloud Registration", Sensors, vol. 20, No. 18, 2020, pp. 1-24.

"How to use a KdTree to search", Point Cloud Library, Retrieved on Mar. 20, 2024, Webpage available at : https://pointclouds.org/documentation/tutorials/kdtree_search.html.

Lourakis, "A Brief Description of the Levenberg-Marquardt Algorithm Implemened by levmar", Journal of Foundat Res and Techn, Foundation for Research and Technology—Hellas (FORTH), Feb. 11, 2005, 6 pages.

"Microsoft / Azure-Kinect-Sensor-SDK", github, Retrieved on Mar. 20, 2024, Webpage available at : https://github.com/microsoft/Azure-Kinect-Sensor-SDK.

"Yahboom Technology / Intel-Depth-Camera", github, Retrieved on Mar. 20, 2024, Webpage available at : https://github.com/YahboomTechnology/Intel-Depth-Camera.

"SDK Developer Reference", Intel, API Version 1.27, Intel, 2007-2018, 146 pages.

Chiang et al., "Color Image Enhancement with Saturation Adjustment Method", Journal of Applied Science and Engineering, vol. 17, No. 04, 2014, pp. 341-352.

"Algorithms for Adjusting Brightness and Contrast of an Image", The IE Blog, Retrieved on Mar. 20, 2024, Webpage available at : https://ie.nitk.ac.in/blog/2020/01/19/algorithms-for-adjusting-brightness-and-contrast-of-an-image/.

Zhang, "A Flexible New Technique for Camera Calibration", Technical Report MSR-TR-98-71, Microsoft Research, Dec. 2, 1998, 22 pages.

Office action received for corresponding Finnish Patent Application No. 20235240, dated Nov. 10, 2023, 12 pages.

Dziembowski et al., "Color Correction for Immersive Video Applications", IEEE Access, vol. 09, 2021, pp. 75626-75640.

Li et al., "Collaborative color calibration for multi-camera systems", Signal Processing: Image Communication, vol. 26, No. 01, Jan. 2011, pp. 48-60.

* cited by examiner

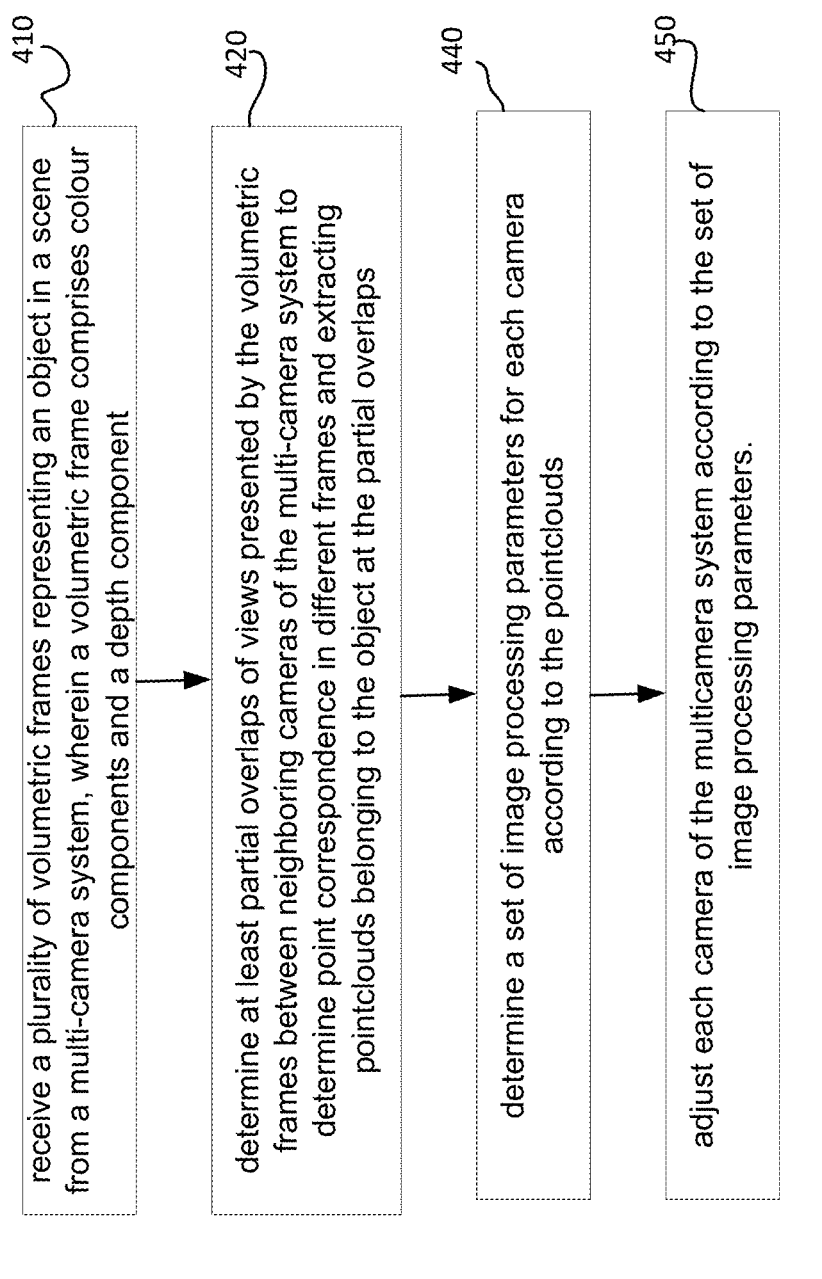

410 receive a plurality of volumetric frames representing an object in a scene from a multi-camera system, wherein a volumetric frame comprises colour components and a depth component

420 determine at least partial overlaps of views presented by the volumetric frames between neighboring cameras of the multi-camera system to determine point correspondence in different frames and extracting pointclouds belonging to the object at the partial overlaps

440 determine a set of image processing parameters for each camera according to the pointclouds

450 adjust each camera of the multicamera system according to the set of image processing parameters.

Fig. 4

METHOD, AN APPARATUS AND A COMPUTER PROGRAM PRODUCT FOR REAL-TIME STREAMING OF VOLUMETRIC VIDEO

The present application claims priority to FI Patent Application Ser. No. 20235240 filed on Feb. 28, 2023, which is hereby incorporated by reference in its entirety.

TECHNICAL FIELD

The present solution generally relates to volumetric video. In particular, the present solution relates to color calibration of capture system for volumetric streaming.

BACKGROUND

Volumetric video data represents a three-dimensional (3D) scene or object and can be used as input for AR (Augmented Reality), VR (Virtual Reality), and MR (Mixed Reality) applications. Such data describes geometry (Shape, size, position in 3D space) and respective attributes (e.g., color, opacity, reflectance, . . . ), and any possible temporal transformations of the geometry and attributes at given time instances (like frames in two-dimensional (2D) video). Volumetric video can be generated from 3D models, also referred to as volumetric visual objects, i.e., CGI (Computer Generated Imagery), or captured from real-world scenes using a variety of capture solutions, e.g., multi-camera, laser scan, combination of video and dedicated depth sensors, and more. Also, a combination of CGI and real-world data is possible. Examples of representation formats for volumetric data comprise triangle meshes, point clouds, or voxels. Temporal information about the scene can be included in the form of individual capture instances, i.e., "frames" in 2D video, or other means, e.g., position of an object as a function of time.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising means for receiving a plurality of volumetric frames representing an object in a scene from a multi-camera system, wherein a volumetric frame comprises color components and a depth component; means for determining at least partial overlaps of views presented by the volumetric frames between neighboring cameras of the multi-camera system to determine point correspondence in different frames and means for extracting pointclouds belonging to the object at the partial overlaps; means for determining a set of image processing parameters for each camera according to the pointclouds; and means for adjusting each camera of the multicamera system according to the set of image processing parameters.

According to a second aspect, there is provided a method, comprising: receiving a plurality of volumetric frames representing an object in a scene from a multi-camera system, wherein a volumetric frame comprises color components and a depth component; determining at least partial overlaps of views presented by the volumetric frames between neighboring cameras of the multi-camera system to determine point correspondence in different frames and extracting pointclouds belonging to the object at the partial overlaps; determining a set of image processing parameters for each camera according to the pointclouds; and adjusting each camera of the multicamera system according to the set of image processing parameters.

According to a third aspect, there is provided an apparatus comprising at least one processor, memory including computer program code, the memory and the computer program code configured to, with the at least one processor, cause the apparatus to perform at least the following: receive a plurality of volumetric frames representing an object in a scene from a multi-camera system, wherein a volumetric frame comprises color components and a depth component; determine at least partial overlaps of views presented by the volumetric frames between neighboring cameras of the multi-camera system to determine point correspondence in different frames and extract pointclouds belonging to the object at the partial overlaps; determine a set of image processing parameters for each camera according to the pointclouds; and adjust each camera of the multicamera system according to the set of image processing parameters.

According to a fourth aspect, there is provided computer program product comprising computer program code configured to, when executed on at least one processor, cause an apparatus or a system to: receive a plurality of volumetric frames representing an object in a scene from a multi-camera system, wherein a volumetric frame comprises color components and a depth component; determine at least partial overlaps of views presented by the volumetric frames between neighboring cameras of the multi-camera system to determine point correspondence in different frames and extract pointclouds belonging to the object at the partial overlaps; determine a set of image processing parameters for each camera according to the pointclouds; and adjust each camera of the multicamera system according to the set of image processing parameters.

According to an embodiment, the set of image processing parameters is encoded to a bitstream.

According to an embodiment, pointclouds are extracted using camera extrinsic parameters.

According to an embodiment, said at least partial overlaps are determined by K-Nearest Neighbor.

According to an embodiment, colors of a camera are calibrated by defining normalized color histogram for all points; determining a median value for image processing parameters for each camera; sampling the image processing parameters of a correspondence patch in each camera as compared to the other; determining offsets for image processing parameters; and calibrating the camera based on the determined offsets.

According to an embodiment, the set of image processing parameters comprises one or more of the following: brightness, saturation, sharpness, contrast.

According to an embodiment, color components of the point correspondences are adjusted based on the set of image processing parameters.

According to an embodiment, the image processing parameters are applied in a camera register calibration or in a camera post-processing calibration to adjust colors of captured images from the multicamera system.

According to an embodiment, the computer program product is embodied on a non-transitory computer readable medium.

DESCRIPTION OF THE DRAWINGS

In the following, various embodiments will be described in more detail with reference to the appended drawings, in which

FIG. 4 is a flowchart illustrating a method according to an embodiment;

DESCRIPTION OF EXAMPLE EMBODIMENTS

Figure 1:
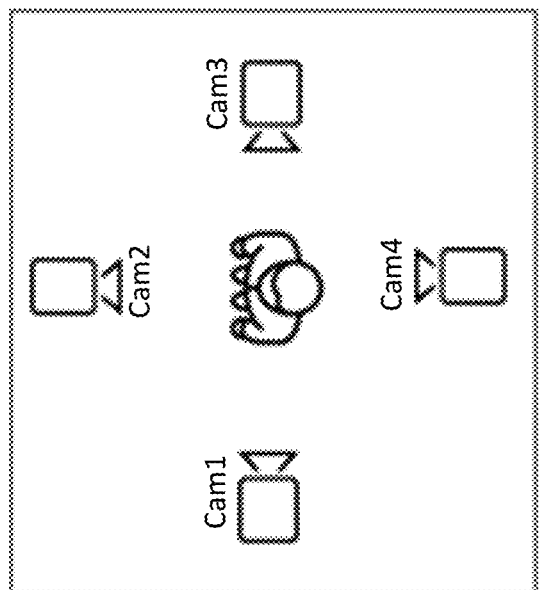
FIG. 1 shows an example of a multi-camera volumetric capture.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment is included in at least one embodiment of the disclosure.

Volumetric video data represents a three-dimensional scene or object and can be used as input for AR, VR and MR applications. Such data describes geometry (shape, size, position in 3D space) and respective attributes (e.g., color, opacity, reflectance, . . . ), plus any possible temporal transformations of the geometry and attributes at given time instances (like frames in 2D video). Volumetric video is either generated from 3D models, i.e., CGI, or captured from real-world scenes using a variety of capture solutions, e.g., multi-camera, laser scan, combination of video and dedicated depth sensors, and more. Also, a combination of CGI and real-world data is possible. Representation formats for such volumetric data are triangle meshes, point clouds, or voxels. Temporal information about the scene can be included in the form of individual capture instances, i.e., "frames" in 2D video, or other means, e.g., position of an object as a function of time.

Because volumetric video describes a 3D scene (or object), such data can be viewed from any viewpoint. Therefore, volumetric video is an important format for any AR, VR or MR applications, especially for providing six degrees of freedom (6DoF) viewing capabilities.

Unlike 3DoF experience, an immersive 6DoF representation enables a larger viewing-space, wherein viewers have both translational and rotational freedom of movement. In a 3DoF visual experience, content is presented to viewers as if they were positioned at the center of a scene, looking outwards, with all parts of the content positioned at a constant distance. 6DoF experiences allow viewers to move freely in the scene and experience the content from various viewpoints. Contrarily to 3DoF, 6DoF videos enable perception of motion parallax, where the change in relative geometry between objects is reflected with the pose of the viewer.

There are many ways to capture and represent a volumetric frame. The format used to capture and represent the volumetric frame, depends on the processing to be performed on it, and the target application using it. Some examples of the representations are listed below:

A volumetric frame can be represented as a point cloud. A point cloud is a set of unstructured points in 3D space, where each point is characterized by its position in a 3D coordinate system (e.g., Euclidean), and some corresponding attributes (e.g., color information provided as RGBA value, or normal vectors).

A volumetric frame can be represented as images, with or without depth, captured from multiple viewpoints in 3D space. In other words, it can be represented by one or more view frames (where a view is a projection of a volumetric scene on to a plane (the camera plane) using a real or virtual camera with known/computed extrinsics and intrinsics). Each view may be represented by a number of components (e.g., geometry, color, transparency, and occupancy picture), which may be part of the geometry picture or represented separately.

A volumetric frame can be represented as a mesh. Mesh is a collection of points, called vertices, and connectivity information between vertices, called edges. Vertices along with edges form faces. The combination of vertices, edges and faces can uniquely approximate shapes of objects.

Depending on the capture, a volumetric frame can provide the ability to viewers to navigate a scene with six degrees of freedom, i.e., both translational and rotational movement of their viewing pose (which includes yaw, pitch, and roll). The data to be coded for a volumetric frame can also be significant, as a volumetric frame can contain many objects, and the positioning and movement of these objects in the scene can result in many occluded regions. Furthermore, the interaction of light and materials in objects and surfaces in a volumetric frame can generate complex light fields that can produce texture variations for even a slight change of pose.

The volumetric capture technology is a technique that digitizes a three-dimensional space (i.e., the volume of space), object, or environment in real-time using an array of cameras at fixed location set around a target. The target can be both dynamic and static in the scene. A volumetric frame can be represented as images, with or without depth, captured from multiple viewpoints in 3D space. In other words, it can be represented by one or more view frames (where a view is a projection of a volumetric scene onto a plane (the camera plane) using a real or virtual camera with known/computed extrinsic and intrinsic parameters). Each view may be represented by a number of components (e.g., geometry, color, transparency, and occupancy picture), which may be part of the geometry picture or represented separately. A sequence of volumetric frames is a volumetric video.

Due to large amount of information, storage and transmission of a volumetric video requires compression. A way to compress a volumetric frame can be to project the 3D geometry and related attributes into a collection of 2D images along with additional associated metadata. The projected 2D images can then be coded using 2D video and image coding technologies, for example ISO/IEC 14496-10 (H.264/AVC) and ISO/IEC 23008-2 (H.265/HEVC). The metadata can be coded with technologies specified in specification such as ISO/IEC 23090-5. The coded images and the associated metadata can be stored or transmitted to a client that can decode and render the 3D volumetric frame.

The present embodiments relate to real-time streaming of volumetric video, which means that processing of captured volumetric frames has direct impact on the latency as experienced by the receiver (i.e., client device). In this context, it is an aim to provide a multi-camera (i.e., capture system) color calibration for volumetric streaming system.

The related technology on volumetric capture system comprises e.g., Intel™ large-scale studio and Microsoft™ studio. These earlier versions can be regarded as high-grade quality volumetric capture systems because they are more complex, use professional grade equipment (calibration equipment, camera, lighting), which limits their use for in applications which are low-cost, low-complexity, easy to setup real-time conversation systems. Indeed, the present embodiments are suitable in applications such as real-time conversation with easy to setup by anyone at home, also in unconstrained lighting environment (Natural Scene), and only with the use of non-expensive depth camera devices. In such low-complex systems, a challenge relating to multi-camera color calibration comes up. As a result, a multi-camera color calibration method under volumetric capture is indispensable to create a high-quality experience for the end user.

The present embodiments relate to a solution to improve multi-camera photo-consistency through color calibration. The calibration according to embodiments eliminate artifacts such as differences in block levels and color gains in images (volumetric frames) captured by multiple cameras with different characteristics. The present embodiments lead to improvement in pointcloud/mesh rendering, by reducing geometric and visual artifacts. In addition, some of the present embodiments can help pointcloud registration problems which leads to reduction in geometric artifacts during 3D reconstruction.

The solution according to present embodiments is crucial for visual quality in unconstrained lighting environment, where the cameras are placed in an inward facing scenario (such as in volumetric setup in FIG. 1). In FIG. 1, in this kind of a placement, without homogeneous lighting in the scene, camera Cam1 might be influenced differently compared to the camera Cam3, thus creating some inhomogeneous lighting scenario which eventually influence the system accuracy. For example, camera Cam1 may be influenced by shades of sunlight while camera Cam3 is influenced by shades of electric lights. Therefore, a method for color calibration is needed, that can provide and allow seamless blend over images acquired by multi-camera views and setup. As a result, this will help to produce a high-quality mesh and pointcloud rendering with seamless surface blend.

The calibration methods of related technology can be split in two categories:
1) hardware camera register calibration; and
2) camera image postprocessing calibration.

Figure 2:
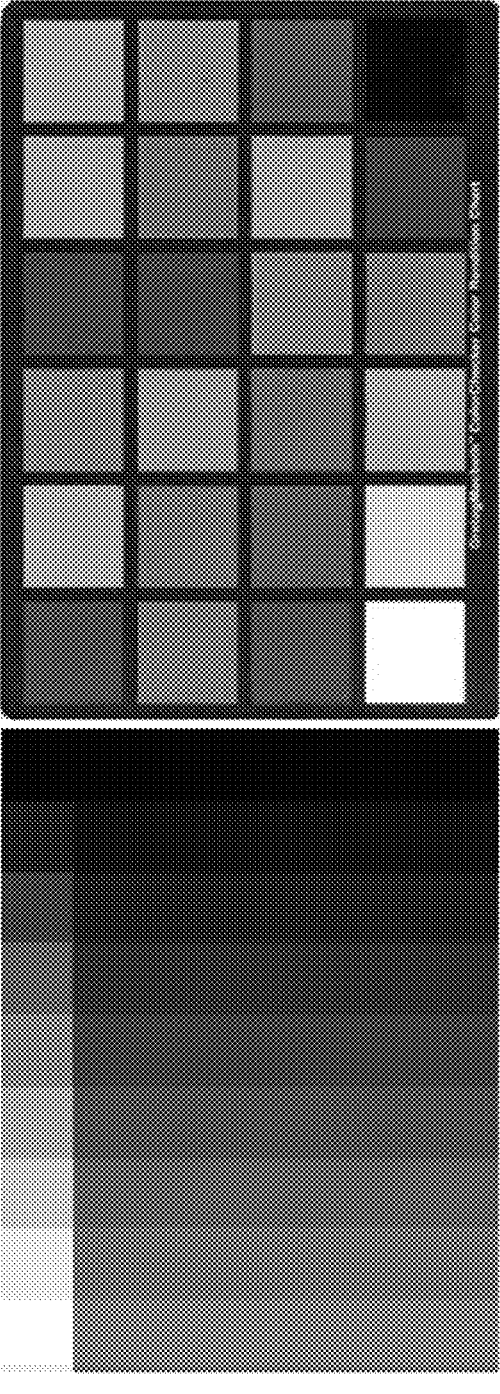
FIG. 2 shows a planar color calibration pattern.

The methods of the category 1) modify the internal camera registers in order to obtain cameras' responses as similar as possible. This may be done one-time at offline stage, and during online stage, the camera parameters can be manually controlled at camera start or open process. Typically, balancing of the responses is performed with respect to a known color calibration pattern (i.e., standardized color rendition chart FIG. 2, the different shades of gray represent different colors). The process requires all the cameras to capture simultaneously an image of the color calibration pattern, thus the devices have to be arranged in a way, such that they share the same significant portion of their field of view. If this requirement is fulfilled, the location of the different color samples is detected, and the correspondences between color samples in different cameras can be found. Once correspondences are known, an optimization problem is defined in order to transform the image color values to match the reference colors.

The methods in category 2) are mostly targeted for online process but can still be used as offline to improve the first category. A hardware register calibration is not free of residual errors, which have to be corrected by a further calibration step in image post-processing. A number of calibration methods in image post-processing can be considered: linear transform-based methods (with or without offset correction values), polynomial models, scatter point interpolation, or linear interpolation of weighted radial basis functions. Each of these methods aim at determining the parameters of the model describing the I/O relationship, being the colors captured by the camera (i.e., the input), and the colors in the reference color calibration pattern (i.e., the output).

In addition, there are other methods that do not use color calibration pattern but can be grouped under the category 2). There is the Image Gradient Based that can be used to adjust camera exposure for a mobile robot on motion, and also multi-camera setup. The author uses local gradient information to achieve both brightness consistency between adjacent cameras and a proper exposure level for each camera. Other methods such as entropy based are also possible.

The methods from the related technology are not suitable for volumetric capture (i.e., inward-facing multi-camera placement). The methods that use planar color calibration pattern are constrained by the need to have the calibration target well visible in all the cameras. As a result, skewed placement and reflections from placement angles can affect the proper calibration. In addition, (i) the use of planar target is not appropriate to capture the color differences in the culled Region of Interest (ROI) for volumetric setup, and (ii) the working distance to the target being larger also impacts the system. As a result, it will be appropriate to use 3D calibration target (e.g., cylindrical shape color pattern), but such solution will introduce more complexity in the process.

Thus, the color calibration method according to present embodiments is designed to be suited for volumetric capture setup. The embodiments do not require the use of specialized planar/3D color calibration target. It may only require simultaneous capture image of a well-lighted object or a human in the ROI of the scene. The present embodiments provide brightness and saturation parameters that can be applied either as hardware camera register calibration approach, and/or camera image postprocessing calibration approach.

In a method according to present embodiments, an unsupervised color correction is performed on images captured with multiple cameras. The proposed algorithm requires a minimal common reference area for each pair of cameras in the setup (such as simultaneous capture image of a well-lighted object or a human in the ROI in the scene). The solution only requires minimal overlap between the captured images; i.e., not requiring specific calibration pattern known a-priori (planar/3D color calibration target); and optionally capable of working in real-time for volumetric streaming application. The present embodiments provide brightness and saturation parameters that can then be either (i) manually applied at offline stage during camera start/open process to modify the internal camera registers. This process leads to cameras responses as similar as possible in the multi-camera setup and/or (ii) in image post-processing step to obtain similar image blending at both either offline or online stage.

The present embodiments may need coarse initial extrinsic calibration of the volumetric camera setup to determine region of partial overlaps between camera pairs. According to an example, j=1 . . . N is the number of non-reference cameras, while ref is the reference camera index. The reference camera index may be the first camera. In the present embodiments, a set of image processing parameters, e.g., brightness and saturation, are defined. The brightness and saturation parameters of a camera are defined as $$\left(\beta_j^{ref}, \alpha_j^{ref}\right).$$

The solution according to embodiments estimates the brightness and saturation offset parameters $$\left(\Delta\beta_j^{ref}, \Delta\alpha_j^{ref}\right)$$

from pointclouds located at the partial overlap regions. Due to simplicity of the approach, it is possible to cope with real-time constraints in an online scenario.

The output of the algorithm is a measure of how much brighter or dimmer each camera needs to be to match each other camera by normalizing pixel response across cameras for consistent texturing and blending.

Thus, a method according to an embodiment comprises:
capturing a well-lit object in the scene from a various viewpoints of a multi-camera system;
given camera extrinsic parameters from volumetric setup;
extracting pointclouds at the partial overlaps between all camera pairs:
For example, in FIG. 1, a reference camera Cam1 would have the best pair with either non-reference camera Cam2 or non-reference camera Cam4, whereas a reference camera Cam3 would have best pair with either non-reference camera Cam2 or non-reference camera Cam4, respectively
using the pointcloud and associated data:
extracting brightness $$\Delta\beta_j^{ref}$$

and saturation $$\Delta\alpha_j^{ref}$$

offset parameters (or other image processing parameters) to a reference camera;
Adding the extracted offset parameters to the initial brightness and saturation parameters (or other image processing parameters) to create updated parameters;
using the updated brightness and saturation parameters (or other image processing parameters) to blend the image captures cleanly. Although the brightness and saturation parameters are optimized between camera pairs of overlap, the proposed iterative solution ensures that the brightness is consistent globally and provides consistent solution on all the cameras in the setup.

In the above algorithm, the object can be a human or non-human object. Given setting non-reference camera index j=1 and reference index ref=0, and defining the initial brightness and saturation parameters (or other image processing parameters) as $\bar{\beta}_j$, and $\bar{\alpha}_j$ respectively.

The offsets $$\Delta\beta_j^{ref} \text{ and } \Delta\alpha_j^{ref}$$

are values estimated that best normalize overlapping points between pair of devices with common partial overlap. The brightness $\beta_j$ and saturation $\alpha_j$ parameters, as used in the example, are:

$$\beta_1 = \bar{\beta}_1 + \Delta\beta_1^0 \tag{1}$$

$$\alpha_1 = \bar{\alpha}_1 + \Delta\alpha_1^0 \tag{2}$$

and used at camera control end by hardware camera register calibration, or at camera image postprocessing calibration.

The above method can be implemented by means of a device, comprising a processor and a memory. In addition, the device according to an embodiment comprises
means, e.g., a capturing module, for capturing a well-lit object in the scene from a various viewpoints of a multi-camera system;
given camera extrinsic parameters from volumetric setup;
means, e.g., extracting module, for extracting pointclouds at the partial overlaps between all cameras
means, e.g., processing module, for using the pointcloud and associated data to
extract brightness $$\Delta\beta_j^{ref}$$

and saturation $$\Delta\alpha_j^{ref}$$

offsets to a predefined reference camera. It is noted that other image processing parameter offsets can be used instead;
set non-reference camera index j=1 and reference index ref=0, and defining the initial brightness and saturation parameters as $\bar{\beta}_j$, and $\bar{\alpha}_j$ respectively;
and means, e.g., blending module, for blending the image captures cleanly by using the brightness and saturation parameters.

The method and the operation of the device is discussed in more detailed manner. In the following, Azure™ Kinect is used as an example of a device under volumetric capture (using a camera system with four cameras), wherein human subject is used as the calibration object. It is appreciated that the number of cameras in the camera system and the calibration object can vary. Each of the camera of the camera system may capture only a single image simultaneously with the other cameras, thus resulting in four images when four cameras are used. An image may comprise depth information to determine pointcloud and color information to determine texture. If depth information is not available, some monocular and multi-view depth estimation can be performed to estimate the depth. In another embodiment, camera extrinsic parameters can be used to infer coarse depth estimates.

The discussion that follows is grouped in three parts:
1) Pointcloud light extraction
2) Color calibration
3) Color processing Pointcloud Light Extraction:

Point clouds belonging to calibration object (e.g., human) are extracted from images by means of camera extrinsic (i.e., pose) calibration parameters. The images can be any image having depth and color information or any image from which depth and color information can be derived. As an example, the image can be an RGB-D image. The camera extrinsic parameters allow to determine the region of points overlap between neighboring cameras, whereupon K-Nearest Neighbor (KNN) is used to determine correspondences of 3D points between a pair of cameras in that overlap region. The KNN algorithm is designed to minimize a probabilistic cost using color-supported soft matching of points between reference and non-reference ones. An optimized version of KNN implementation can be used, which is based on K-Dimensional tree (k-d tree) search algorithm for better performance. The k-d tree approach uses a constrained imposed binary search tree to find the K-Nearest Neighbors of a specific point, and then find all neighbors from the other camera pair within a radius parameter specified by the user. The output of the process comprises both a color value (e.g., RGB value) and associated point for individual camera device. This process can be implemented in ExtractCloudLighting function as shown in below:

ExtractCloudLighting

Extract Points (X,Y,Z) from depth images, using camera extrinsic and intrinsic parameters Determine a region, where points of different images overlap and which points correspond to each other 1. Use extrinsics information to determine the neighboring cameras, and compare only neighboring cameras to determine the overall and the correspondences;

2. Use fast K-Nearest Neighbors (KNN) approach to identify the points that are roughly shared between cameras. The output of the KNN can be a plurality of patches.

Provide an output on the point correspondence from nearest neighbor points (X,Y,Z) and associated color (e.g., R,G,B) to each device.

Color Calibration

Color calibration is implemented inside the ColorNormalization function. The color values for extracted point correspondences from the patches from the KNN approach are normalized. At first, a median value for image processing parameters (e.g., brightness and saturation) for each camera of the multi-camera system is determined. The brightness median value is determined by estimating the absolute difference between the normalized color (e.g., RGB) of the correspondence pointclouds, and then by extracting the median percentile of the output result. The saturation median value is accomplished by estimating the logarithm of the absolute difference between the normalized color of the correspondence pointclouds, and then by extracting the median percentile of the output result. These operations produce a scalar value for both brightness and saturation median values. Furthermore, the brightness and saturation delta values are defined by adding −ve to +ve range to the brightness median values for each device.

These initial delta values are sent to a solver module that uses an iterative step process to minimize the differences in brightness and saturation until median value of non-reference camera is very close to the reference camera. Hence, the optimal delta value indicates the luminance of the pointclouds.

This process can be implemented in ColorNormalization function as shown in below:

ColorNormalization

Create a color histogram (Normalized RGB) for all points (x,y,z);

Determine brightness median value (i.e., a scalar value):

Define normalized color histogram difference by estimating absolute difference between correspondence pointcloud patch;

Brightness scalar is the median of the normalized color histogram difference:

Brightness deltas[i*count: i*count+1]=[brightness_scalar; −brightness_scalar], where count is the number of cameras, and i is a counter.

Determine saturation median value (i.e., scalar value):

Define normalized logarithm color difference by estimating absolute logarithm difference between correspondence pointcloud patch;

Saturation scalar is the median of normalized logarithm color difference;

Saturation deltas[i*count: i*count+1]=[saturation_scalar; saturation_scalar], where count is the number of cameras, and i is a counter.

In an embodiment, i can be number of points and saturation_scalar will become saturation_vector with repeated scalar values in-ve and +ve range.

Sample the brightness and saturation of the KNN nearest correspondence image patch in each camera as compared to the other The output of this is the best pair of cameras (i.e., a reference and a non-reference camera pair) in the multi-camera setup, to be sent to the next iterative solver module;

Iterative solver module is used to determine brightness and saturation offsets

1. In a simple optimization according to embodiments, at each iteration all corresponding patches in the setup are compared, and moved at a steady step rate until patches color matches;

2. The input to the optimization framework comprises the deltas, step rate parameter 0.02 (selected based on experimental tests) for increment optimization, and iteration of 200 (selected based on experimental tests). It is to be noticed that the step rate parameter and the number of iteration rounds can be other values instead the ones given in this example;

3. The loss to be minimized is the median difference of how close the secondary camera is to the main camera (Step process iteration, minimize to zero);

4. Let non-reference camera index be j=1, and reference index ref=0: the initial brightness and saturation parameters are defined as $\overline{\beta}_j$ and $\overline{\alpha}_j$ respectively:

The brightness $\beta_j$ and saturation $\alpha_j$ parameters are:

$$\beta_1 = \overline{\beta}_1 + \Delta\beta_1^0$$

-continued $$\alpha_1 = \overline{\alpha}_1 + \Delta \alpha_1^0$$

The optimization process as shown above is a very simple and non-complicated process. However, instead of the one shown above, other forms of linear and non-linear optimization such as Levenberg Marquardt can be used.

Color Processing

The estimated image processing parameters (e.g., brightness and saturation parameters) can be applied in two categories:

1) as hardware camera register calibration approach, and/or 2) as camera image postprocessing calibration approach Hardware camera register calibration approach is implemented inside the UpdateLightness function. An example implementation shows how the brightness and saturation parameters $\beta_j$ and $\alpha_j$ can be used using hardware camera register calibration step. This can be done as part of camera control using function provided in Kinect Azure SDK provided on https://github.com/Microsoft/Azure-Kinect-Sensor-SDK.

During implementation, the brightness and saturation parameters from the proposed calibration method can be controlled as part of V3C metadata, and set as shown in below:

```
{
    Brightness: 0.0 // −100.0 to +100.0 [default 0]
    Saturation: 1.0 // 0.0 to 10.0 [default 5]
}
```

The default values are 0 and 5 for brightness and saturation, respectively.

In another embodiment, the brightness and saturation range are not limited to (−100 to +100), (0.0 to 10.0) respectively. Indeed, some devices have different ranges, and the proposed method can be easily extended for those. For example, brightness can be (0 to 256) [default 128], and saturation can be (0.0 to 64 default 32).

In another embodiment, sharpness and contrast information can be incorporated by following the proposed idea. In such embodiment, one may use the standard deviation of the gray scale color image of the patches as the contrast median value. Therefore, the parameters can be any image processing parameters, of which brightness, saturation, sharpness, and contrast are given as examples.

Based on the Kinect Azure SDK, the parameters can be set manually at camera device open/setup using SetControl-Manual function as shown in below:

```
void UpdateLightness( )
{
    SetControlManual(K4A_COLOR_CONTROL_BRIGHTNESS, βⱼ)
    SetControlManual(K4A_COLOR_CONTROL_SATURATION, αⱼ)
}
```

For most of the depth cameras, the SDK makes it possible to set these image processing parameters (such as brightness and saturation) manually. In addition, this approach is not limited to brightness and saturation parameters only, but similar approach can be used to control e.g., camera gain, exposure, or white balance using K4A_COLOR_CONTROL_EXPOSURE_TIME_ABSOLUTE, K4A_COLOR_CONTROL_WHITEBALANCE, K4A_COLOR_CONTROL_GAIN respectively.

In another embodiment, each of the cameras (e.g., the four cameras of the used example) from the multi-camera setup can start with auto exposure, then fix this autoexposure value before proceeding to do the proposed color calibration for other remaining parameters.

Camera image postprocessing calibration can be approached with an implementation, where the brightness and saturation parameters are used in an encoding-decoding framework as a post-processing step before video encoding. In the implementation, for example Intel™'s VPP ProcAmp feature can be used and set the brightness and saturation parameters in the encoding process. In below, the procedure of color calibration with the MFX (Multi-Format Codec) class is shown below:

```
Encoder = std::make_unique<mfx::VideoEncoder>( );
bool success = Encoder−>Initialize(
    image−>IsJpegBuffer ? JpegDecoder−>Allocator :
    RawAllocator, EncoderParams);
```

In this example, the brightness and saturation value are set in the EncoderParams container and passed to the MFX video encoder. At the decoder side, the decoded image is a resulting image wherein the brightness and saturation parameters have been applied successfully.

The MFX video encoder scheme is highly parallelized, fast and operates in real-time. In addition, some of the solutions employed for image enhancement through brightness and saturation parameters are based on image processing methods. Other post-processing methods may comprise, e.g., saturation enhancement method, and brightness constancy, and can use the proposed brightness and saturation values with minimal initial normalization of parameter range.

In another embodiment, this processing with Intel™'s MFX class encoder can be done in a large feedback loop for incremental improvement as soon as video frames appears.

Results

Figure 3B:
FIGS. 3a, 3b show experimental results before and after applying a color calibration according to present embodiments.
Figure 3A:
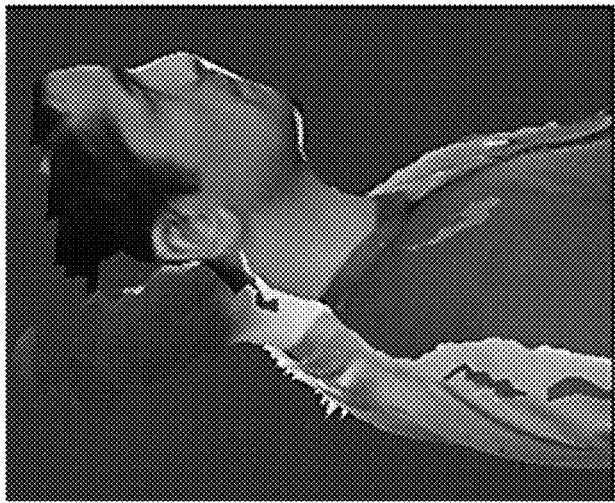

Rendering result of applying the proposed color calibration along the partial overlap of two cameras is shown FIG. 3b, and on FIG. 3a is the initial rendering result without the proposed color calibration.

In FIG. 3b, a processing method that is based on hardware camera register calibration approach has been used. Using the camera image postprocessing calibration approach would give same result as shown FIG. 3b.

The proposed color calibration method improves multi-camera geometry calibration accuracy and visual fidelity of the rendering process.

Pointcloud registration is especially important in perfect geometric alignment of points in multi-camera setup. As the method according to embodiments, ensure photo consistency between all camera images at region of overlap, it makes it possible for popular registration problem that uses color information to work better.

The proposed embodiments are not limited to volumetric setup but can also work for panoramic setup containing multiple devices or even stereo setup, and not limited by the number of cameras. The only constraint is that it needs to know the extrinsic calibration parameters, which is always available from V3C metadata, or photogrammetry method based on point correspondence can be used to estimate coarse extrinsic parameters.

The calibration object (e.g., a human) is not restricted to stay stationary in the scene. This is not a very hard constraint since the calibration images are simultaneously captured at almost same time instance. In another embodiment, some image filtering method can be used to remove motion blur and focus on the stationary part of the calibration target.

The method according to an embodiment is shown in FIG. 4. The method generally comprises receiving 410 a plurality of volumetric frames representing an object in a scene from a multi-camera system, wherein a volumetric frame comprises color components and a depth component; determining 420 at least partial overlaps of views presented by the volumetric frames between neighboring cameras of the multi-camera system to determine point correspondence in different frames and extracting pointclouds belonging to the object at the partial overlaps; determining 440 a set of image processing parameters for each camera according to the pointclouds; and adjusting 450 each camera of the multi-camera system according to the set of image processing parameters. Each of the steps can be implemented by a respective module of a computer system.

An apparatus according to an embodiment comprises means for receiving a plurality of volumetric frames representing an object in a scene from a multi-camera system, wherein a volumetric frame comprises color components and a depth component; means for determining at least partial overlaps of views presented by the volumetric frames between neighboring cameras of the multi-camera system to determine point correspondence in different frames and means for extracting pointclouds belonging to the object at the partial overlaps; means for determining a set of image processing parameters for each camera according to the pointclouds; and means for adjusting each camera of the multicamera system according to the set of image processing parameters. The means comprises at least one processor, and a memory including a computer program code, wherein the processor may further comprise processor circuitry. The memory and the computer program code are configured to, with the at least one processor, cause the apparatus to perform the method of FIG. 4 according to various embodiments.

Figure 5:
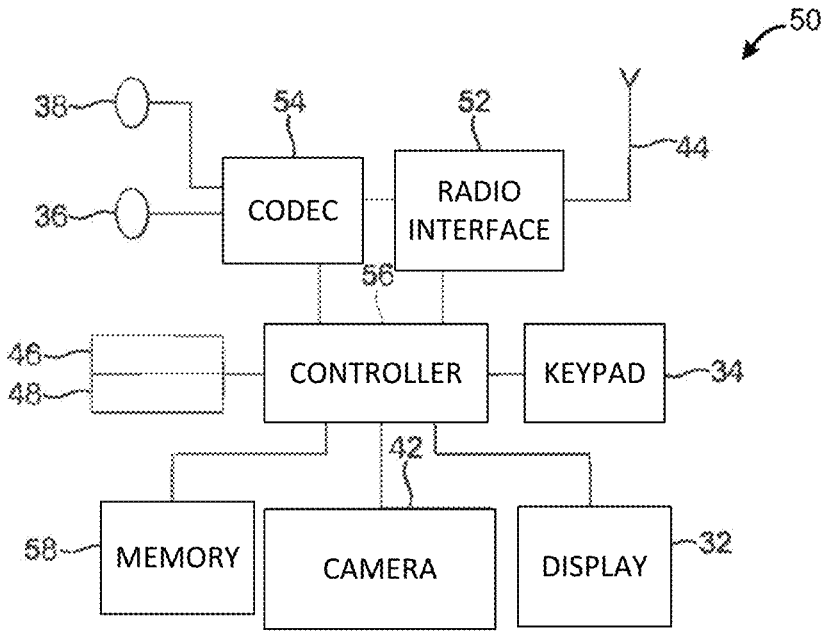
FIG. 5 shows an example of an apparatus.

An example of an apparatus is disclosed with reference to FIG. 5. FIG. 5 shows a block diagram of a video coding system according to an example embodiment as a schematic block diagram of an electronic device 50, which may incorporate a codec. In some embodiments the electronic device may comprise an encoder or a decoder. The electronic device 50 may for example be a mobile terminal or a user equipment of a wireless communication system or a camera device. The electronic device 50 may be also comprised at a local or a remote server or a graphics processing unit of a computer. The device may be also comprised as part of a head-mounted display device. The apparatus 50 may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The camera 42 may be a multi-lens camera system having at least two camera sensors. The camera is capable of recording or detecting individual frames which are then passed to the codec 54 or the controller for processing. The apparatus may receive the video and/or image data for processing from another device prior to transmission and/or storage.

The apparatus 50 may comprise a controller 56 or processor for controlling the apparatus 50. The apparatus or the controller 56 may comprise one or more processors or processor circuitry and be connected to memory 58 which may store data in the form of image, video and/or audio data, and/or may also store instructions for implementation on the controller 56 or to be executed by the processors or the processor circuitry. The controller 56 may further be connected to codec circuitry 54 suitable for carrying out coding and decoding of image, video and/or audio data or assisting in coding and decoding carried out by the controller.

The apparatus 50 may further comprise a card reader 48 and a smart card 46, for example a UICC (Universal Integrated Circuit Card) and UICC reader for providing user information and being suitable for providing authentication information for authentication and authorization of the user at a network. The apparatus 50 may comprise radio interface circuitry 52 connected to the controller and suitable for generating wireless communication signals for example for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es). The apparatus may comprise one or more wired interfaces configured to transmit and/or receive data over a wired connection, for example an electrical cable or an optical fiber connection.

The various embodiments can be implemented with the help of computer program code that resides in a memory and causes the relevant apparatuses to carry out the method. For example, a device may comprise circuitry and electronics for handling, receiving, and transmitting data, computer program code in a memory, and a processor that, when running the computer program code, causes the device to carry out the features of an embodiment. Yet further, a network device like a server may comprise circuitry and electronics for handling, receiving, and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus, comprising:
   at least one processor,
   at least one memory including program code, the memory and the program code configured to, with the at least one processor, cause the apparatus to perform at least the following:
   receiving a plurality of volumetric frames representing an object in a scene from a multi-camera system, wherein a volumetric frame comprises color components and a depth component;
   determining at least partial overlaps of views presented by the plurality of volumetric frames between neighboring cameras of the multi-camera system to determine point correspondence in different frames and extracting pointclouds belonging to the object at the at least partial overlaps;
   determining a set of image processing parameters for each camera according to the pointclouds;
   adjusting the each camera of the multi-camera system according to the set of image processing parameters;
   calibrating colors of the each camera by:
   defining a normalized color histogram for all points;
   determining a median value for image processing parameters for the each camera;
   sampling the image processing parameters of a correspondence patch in the each camera as compared to the other;
   determining offsets for the image processing parameters; and
   calibrating the each camera based on the determined offsets.

2. The apparatus according to claim 1, wherein the apparatus is further caused to perform encoding the set of image processing parameters to a bitstream.

3. The apparatus according to claim 1, wherein the pointclouds are extracted using camera extrinsic parameters.

4. The apparatus according to claim 1, wherein the apparatus is further caused to perform determining the at least partial overlaps by k-nearest neighbor.

5. The apparatus according to claim 1, wherein the set of image processing parameters comprises one or more of the following: brightness, saturation, sharpness, or contrast.

6. The apparatus according to claim 1, wherein the apparatus is further caused to perform adjusting color components of the point correspondences based on the set of image processing parameters.

7. The apparatus according to claim 1, wherein the apparatus is further caused to perform applying the set of image processing parameters in a camera register calibration or in a camera post-processing calibration to adjust colors of captured images from the multi-camera system.

8. A method, comprising:
   receiving a plurality of volumetric frames representing an object in a scene from a multi-camera system, wherein a volumetric frame comprises color components and a depth component;
   determining at least partial overlaps of views presented by the plurality of volumetric frames between neighboring cameras of the multi-camera system to determine point correspondence in different frames and extracting pointclouds belonging to the object at the at least partial overlaps;

determining a set of image processing parameters for each camera according to the pointclouds;
adjusting the each camera of the multi-camera system according to the set of image processing parameters; and
calibrating colors of the each camera by:
   defining a normalized color histogram for all points;
   determining a median value for image processing parameters for the each camera;
   sampling the image processing parameters of a correspondence patch in the each camera as compared to the other;
   determining offsets for the image processing parameters; and
   calibrating the each camera based on the determined offsets.

9. The method according to claim 8, further comprising encoding the set of image processing parameters to a bitstream.

10. The method according to claim 8, wherein the pointclouds are extracted using camera extrinsic parameters.

11. The method according to claim 8, further comprising determining the at least partial overlaps by k-nearest neighbor.

12. The method according to claim 8, wherein the set of image processing parameters comprises one or more of the following: brightness, saturation, sharpness, or contrast.

13. The method according to claim 8, further comprising adjusting color components of the point correspondences based on the set of image processing parameters.

14. The method according to claim 8, further comprising applying the set of image processing parameters in a camera register calibration or in a camera post-processing calibration to adjust colors of captured images from the multi-camera system.

15. A non-transitory program storage device readable by a machine, tangibly embodying a program of instructions executable by the machine for performing operations, the operations comprising:
   receiving a plurality of volumetric frames representing an object in a scene from a multi-camera system, wherein a volumetric frame comprises color components and a depth component;
   determining at least partial overlaps of views presented by the plurality of volumetric frames between neighboring cameras of the multi-camera system to determine point correspondence in different frames and extracting pointclouds belonging to the object at the at least partial overlaps;
   determining a set of image processing parameters for each camera according to the pointclouds;
   adjusting the each camera of the multi-camera system according to the set of image processing parameters; and
   calibrating colors of the each camera by:
   defining a normalized color histogram for all points;
   determining a median value for image processing parameters for the each camera;
   sampling the image processing parameters of a correspondence patch in the each camera as compared to the other;
   determining offsets for the image processing parameters; and
   calibrating the each camera based on the determined offsets.

16. The non-transitory program storage device according to claim 15, wherein the operations further comprise encoding the set of image processing parameters to a bitstream.

17. The non-transitory program storage device according to claim 15, wherein the pointclouds are extracted using camera extrinsic parameters.

18. The non-transitory program storage device according to claim 15, wherein the operations further comprise determining the at least partial overlaps by k-nearest neighbor.

19. The non-transitory program storage device according to claim 15, wherein the set of image processing parameters comprises one or more of the following: brightness, saturation, sharpness, or contrast.

20. The non-transitory program storage device according to claim 15, wherein the operations further comprise applying the set of image processing parameters in a camera register calibration or in a camera post-processing calibration to adjust colors of captured images from the multi-camera system.

* * * * *